2,764,494

METHODS OF PREPARING HIGHLY-REFRACTORY BLOCKS OR OTHER MASSES

Karl Albert, Vogelbeck, Hannover, Germany

No Drawing. Application May 14, 1952,
Serial No. 287,809

6 Claims. (Cl. 106—62)

The present invention is concerned with those methods of preparing highly-refractory blocks and other masses in which the basic raw material is mixed, in finely-divided condition, with a cold bonding agent, for example waterglass, is thereafter shaped by tamping, shaking down, pressing, or like methods, and is finally dried at temperatures of the order of 200° C.

Such cold-bonded bricks and masses (hereinafter referred to, for convenience, simply as "blocks") commend themselves for use in numerous instances by reason of the high resistance to temperature variation which they exhibit and their small heat conductivity, and are being increasingly used in the cement and lime industry.

In this connection, the granulated raw material used has, for instance, been sintered magnesite and thermite slag or substances which, in addition to aluminium oxide and silicic acid ($SiO_2$), contain other oxides of high melting point, for example those of elements of groups 4 to 7 of the periodic table, especially titanium, chromium, molybdenum and tungsten.

When, however, such blocks are exposed to fire temperatures of about 600–1200° C., the cold-bonding by the added cold bonding agent, e. g. water-glass, breaks down, and consequently the blocks become relatively brittle in this temperature range. It is known to add a binder in the form of ground fire clay or brick dust to the starting materials, with the object of consolidating the blocks at these temperatures, thus producing compounds of the $Na_2O$—$Al_2O_3$—$SiO_2$ system under the heat conditions.

These compounds bond the magnesite granules together by virtue of the formation of readily-fusible eutetic substances. The readily-fusible compounds which first form take up magnesium oxide and are slowly transformed into higher melting-point compounds thereby producing a gradual penetrative sintering of the block during its use in the firing oven. The addition of the binder is so controlled that only the surface of the refractory mass, e. g. of each magnesite granule, is fluxed, whilst the granule itself, which is responsible for the refractory effect and the mechanical rigidity, remains solid.

It has now been established that the sintering throughout of the blocks, and consequently their strength when subjected to heat, is substantially improved if the granulated raw materials have added thereto a mixture of ground aluminium silicates and/or alkali—and/or alkaline earth-aluminium-silicates, or different melting or softening points, with a maximum particulate size of up to 0.2 mm. and in amounts from 0.5 to 20%, preferably 1 to 5%.

Thus, for instance, a mixture of calcined clays of various melting or softening points, for example a mixture of red brick dust and grog in the proportion of one part of the brick dust to two of grog, can be added to the granulated raw material. A stagewise sintering takes place as a consequence of the differing melting or softening points, causing a very slow, continuous progression of the sintering action in the structure of the block.

In a preferred embodiment of the invention the granulated raw material has added thereto a binder consisting of a mixture of ground, calcined clay and glass. This prevents the occurrence of undesirable sinter deposits, viz. a highly-sintered outer portion of the block which can be attributed to a discontinuous sintering of the latter and frequently leads to cracking if the oven is cooled suddenly. In addition the compressive strength in the cold, and stability under conditions of temperature variation, are further substantially increased.

Ground fire clay (grog) or brick dust can be added as the calcined clay. It is, however, useful to employ a mixture of grog and brick dust for this purpose. The added binder mixture then, for instance, consists in all of approximately equal parts of ground grog, red brick dust, and powdered glass, or of about one part each of the grog and brick dust to about two parts of ground glass.

Furthermore, instead of waterglass solutions of alkaline compounds containing colloidal silicic acid or aluminium oxide can be added to the mixture of granulated magnesite and binder, to facilitate moulding.

Again, instead of this alkaline cold bonding agent, solutions of neutral, semi-acidic or acidic salts of the alkali and alkaline earth groups may be added to the mixture of granulated magnesite and binder for moulding. An aqueous solution of two to four parts by weight of sodium bisulphate, one to two parts by weight of magnesium sulphate, two to three parts by weight of sulphuric acid ($d=1.83$), and four to eight parts by weight of water, has been found particularly satisfactory.

In accordance with the present invention, pieces of calcined magnesite of different origin, e. g. of sintered magnesite or used magnesite bricks, are mixed with the binders cited, preferably in the following granule sizes and ratios:

| | Per cent |
|---|---|
| Magnesite (granule size 10 to 3 mm.) | 15 to 50 |
| Magnesite (granule size 3 mm. or smaller) | 30 to 55 |
| Ground magnesite | 10 to 30 |
| Ground grog | 0.5 to 5 |
| Brick dust | 0.5 to 5 |
| Ground glass | 0.5 to 10 |

For moulding the aforesaid mixture of calcined magnesite and binder, a cold bonding agent, for example, 6% by weight of water-glass ($d=1.350$) relatively to the mixture, is added and the mixture rendered plastic with water. The ingredients are thoroughly mixed and the mixture compressed into bricks by agitation, ramming down, or pressing, or the mixture is employed as a moulding paste. The products are then dried by heating to 100 to 250° C.

The cold bonding agents are added in solution to the mixture in the ratio of about 5 to 12 percent by weight of the solids. Instead of being added in solution, the material concerned can be added in solid form and dissolved by the addition of, preferably warm, water.

The following are specific examples of methods according to this invention:

*Example I*

Pieces of calcined magnesite of the following grain sizes:

| | Per cent |
|---|---|
| 5–2 mm. | 30–60 |
| 2 mm. or smaller | 20–30 |
| Powder | 20–30 |
| Grog and brick dust | 4 | are mixed and made up with a solution of

2–4 parts by weight of sodium bisulphate
1–2 parts by weight of epsom salts
2–3 parts by weight of sulphuric acid ($d=1.83$)
4–8 parts by weight of water and pressed into blocks. An addition of approximately 6–10 parts by volume of this solution to each 100 parts by weight of the mixture gives best results.

Blocks made in this way have very good properties such as great resistance to temperature variations, and do not crack under the effect of abrupt temperature changes. Furthermore they are of low heat conductivity, so that they can be set directly on, say, an oven cover with only a small amount of mortar.

*Example II*

A mixture of:

|  | Per cent |
|---|---|
| Magnesite of 3 to 6 mm. grain size | 15 to 35 |
| Magnesite of 3 mm. or smaller grain size | 20 to 55 |
| Ground magnesite | 20 to 30 |
| Ground glass | 1 |
| Ground grog | 0.5 |
| Brick dust | 0.5 | is mixed with 6 percent by weight of water-glass ($d=1.350$) and that quantity of water required to render the mixture plastic. Blocks made by shaking the same down in moulds are heated to temperature of 100 to 250° C. and thus bonded.

*Example III*

A mixture in accordance with Example II is rendered plastic by the addition of a solution of:

2 to 4 parts by weight of sodium bisulphate
1 to 2 parts by weight of epsom salts
2 to 3 parts by weight of sulphuric acid ($d=1.83$)
4 to 8 parts by weight of water About 5 to 12 percent by weight of the solution, relatively to the mixture, is actually added. The moulded objects obtained by shaking down or stamping the product are bonded by heating to temperatures of the order of 100° to 250° C.

I claim:

1. A method of manufacturing refractory products for lining furnaces, including the steps of mixing a granulated basic refractory material with a binder of 0.5 to 20% by weight of a mixture of equal parts of ground calcined clay and ground glass, adding 6% by weight of waterglass having a density $d=1.350$ as a cold binding agent and sufficient water to render the mixture plastic, forming the mixture into the shape of said product and heating the product so shaped to a temperature between 100° and 250° C.

2. A method as set forth in claim 1, in which said ground calcined clay consists of a mixture of equal parts of ground brick and ground fire clay.

3. A method as set forth in claim 1, in which said ground calcined clay consists of ground fire clay.

4. A method as set forth in claim 1, in which said ground calcined clay consists of red brick dust.

5. A method as set forth in claim 1, in which said binder consists of a mixture of approximately equal parts by weight of ground fire clay, red brick dust and ground glass.

6. A method as set forth in claim 1, in which said binder consists of a mixture of substantially one part by weight each of ground fire clay and red brick dust and substantially two parts by weight of ground glass.

References Cited in the file of this patent

UNITED STATES PATENTS

| 218,335 | Thomas | Aug. 5, 1879 |
| 428,747 | Eames | May 27, 1890 |
| 1,461,444 | Greenwood | July 10, 1923 |
| 1,893,023 | Fowler | Jan. 3, 1933 |
| 2,304,562 | Gerisch | Dec. 8, 1942 |
| 2,567,088 | Teasel | Sept. 4, 1951 |